US012665631B2

(12) United States Patent
Hong et al.

(10) Patent No.: US 12,665,631 B2
(45) Date of Patent: Jun. 23, 2026

(54) BASE STATION SUPPORTING MULTI-RIS COMMUNICATION AND METHOD OF OPERATING THE BASE STATION

(71) Applicant: University-Industry Cooperation Group of Kyung Hee University, Gyeonggi-do (KR)

(72) Inventors: Choong Seon Hong, Gyeonggi-do (KR); Sang Hoon Hong, Gyeonggi-do (KR); Hyeon Su Kim, Gyeonggi-do (KR); Pyae Sone Aung, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 352 days.

(21) Appl. No.: 18/509,507

(22) Filed: Nov. 15, 2023

(65) Prior Publication Data

US 2024/0171223 A1     May 23, 2024

(30) Foreign Application Priority Data

Nov. 15, 2022 (KR) ........................ 10-2022-0152749
Feb. 7, 2023 (KR) ........................ 10-2023-0016273

(51) Int. Cl.
*H04B 7/04*        (2017.01)
*H04W 52/26*      (2009.01)
*H04W 52/36*      (2009.01)

(52) U.S. Cl.
CPC ...... *H04B 7/04013* (2023.05); *H04W 52/267* (2013.01); *H04W 52/367* (2013.01)

(58) Field of Classification Search
CPC ............ H04B 7/04013; H04W 52/267; H04W 52/367
See application file for complete search history.

(56) References Cited

U.S. PATENT DOCUMENTS

2021/0368437 A1* 11/2021 Kim ................. H04W 52/0212
2023/0208486 A1* 6/2023 Dai ..................... H04B 7/0617
                                                                    370/315

FOREIGN PATENT DOCUMENTS

CN              113726390 A * 11/2021 ......... H04B 7/04013
KR     10-2022-0156599 A     11/2022

OTHER PUBLICATIONS

Office action issued on Nov. 27, 2025 from Korean Patent Office in a counterpart Korean Patent Application No. 10-2023-0016273 (all the cited references are listed in this IDS.) (English translation is also submitted herewith.).

(Continued)

*Primary Examiner* — Samina F Choudhry
(74) *Attorney, Agent, or Firm* — The PL Law Group, PLLC

(57)        ABSTRACT

The base station according to an embodiment communicates with one or more user terminals through one or more reconfigurable intelligent surfaces (RISs). The base station includes a communicator that performs communication with at least one of the one or more user terminals and the one or more reconfigurable intelligent surfaces, and a controller connected to the communicator, and the controller may determine a matching state of the one or more user terminals and the one or more reconfigurable intelligent surfaces that maximizes a sum of data rates for the one or more user terminals connected through the communicator, on/off states of one or more reflective elements included in the one or more reconfigurable intelligent surfaces, total power consumption, and a phase value of the one or more reflective elements included in the one or more reconfigurable intelligent surfaces.

13 Claims, 2 Drawing Sheets

(56) References Cited

OTHER PUBLICATIONS

Gilsoo Lee et al., "Deep Reinforcement Learning for Energy-Efficient Networking with Reconfigurable Intelligent Surfaces", IEEE, Jul. 27, 2020, DOI:10.1109/ICC40277.2020.9149380.
Sifan Liu et al., "BS-RIS-User Association and Beamforming Designs for RIS-aided Cellular Networks", IEEE, Jun. 27, 2021, DOI:10.1109/ICCC52777.2021.9580193.
Zhaohui Yang et al., "Energy-Efficient Wireless Communications with Distributed Reconfigurable Intelligent Surfaces", arXiv, May 2020, DOI:10.48550/arXiv.2005.00269.

* cited by examiner

BASE STATION SUPPORTING MULTI-RIS COMMUNICATION AND METHOD OF OPERATING THE BASE STATION

GOVERNMENT LICENSE RIGHTS

National research and development program that supported this invention
Project identification number: 1711194179
Project number: 00207816
Name of Ministry: Ministry of Science and ICT
Name of project management (professional) organization: National Research Foundation of Korea
Research program name: Group research support
Research project name: Development of core structure of Satellite-Air-Ground integrated networking system based on Meta Federated Learning
Contribution rate: ¼
Project carrying out organization name: Kyung Hee University Industry-Academic Cooperation Foundation
Research period: Mar. 1, 2023~Feb. 29, 2024
National research and development program that supported this invention
Project identification number: 1711193491
Project t number: 2019-0-01287-005
Name of Ministry: Ministry of Science and ICT
Project management (professional) organization name: Information and Communications Planning and Evaluation Institute
Research program name: SW computing industry source technology development
Research project name: (SW Star Lab) Evolutionary deep learning model generation platform for distributed edge
Contribution rate: ¼
Project carrying out organization name: Kyung Hee University Industry-Academic Cooperation Foundation
Research period: Jan. 1, 2023~Dec. 31, 2023
National research and development program that supported this invention
Project identification number: 1711193622
Project number: 2021-0-02068-003
Name of Ministry: Ministry of Science and ICT
Project management (professional) organization name: Information and Communications Planning and Evaluation Institute
Research program name: Information and Communication Broadcasting Innovative Human Resources Training
Research project name: Artificial intelligence innovation hub research and development
Contribution rate: ¼
Project carrying out organization name: Korea University Industry-Academic Cooperation Foundation
Research period: Jan. 1, 2023~Dec. 31, 2023
National research and development program that supported this invention
Project identification number: 1711179316
Project number: 00155911
Name of Ministry: Ministry of Science and ICT
Project management (professional) organization name: Information and Communications Planning and Evaluation Institute
Research program name: Artificial intelligence convergence innovation human resources training
Research project name: Artificial intelligence convergence innovation talent training (Kyung Hee University)

Contribution rate: ¼
Project carrying out organization name: Kyung Hee University Industry-Academic Cooperation Foundation
Research period: Jan. 1, 2023~Dec. 31, 2023

CROSS-REFERENCE TO RELATED APPLICATION AND CLAIM OF PRIORITY

This application claims the benefit under 35 USC § 119 of Korean Patent Application Nos. 10-2022-0152749, filed on Nov. 15, 2022, and 10-2023-0016273, filed on Feb. 7, 2023, in the Korean Intellectual Property Office, the entire disclosure of which are incorporated herein by reference for all purposes.

BACKGROUND

Field

The present disclosure relates to a base station supporting multi-RIS communication and a method of operating the base station.

Description of Related Art

Due to the vast growth of multimedia applications such as the Internet of Things (IoT), augmented reality (AR), virtual reality (VR), video streaming, and online games, the use of a lot of bandwidth is required, and accordingly, the use of a lot of energy is required. In order to solve this energy consumption problem, much research is being conducted to develop a network structure.

Recently, with the advent of 5th generation wireless networks (5G) and 6th generation wireless networks (6G), a reconfigurable intelligent surface (RIS) has received tremendous attention in both academic and industrial fields due to its easy deployment, improved spectral efficiency, and cost-effectiveness.

The RIS is an artificially constructed meta-surface incorporating electronic circuits that can be programmed to reflect incoming signals in various ways, and each RIS unit includes low-cost reflective elements. The RIS can electronically control reflective elements so as to specify a direction of phase shift in a discrete or continuous phase configuration.

SUMMARY

An object of the present disclosure is to provide a base station that supports multi-RIS communications and a method of operating the base station.

According to an aspect of the present disclosure, there is provided a base station that communicates with one or more user terminals through one or more reconfigurable intelligent surfaces (RISs), the base station including a communicator that performs communication with at least one of the one or more user terminals and the one or more reconfigurable intelligent surfaces, and a controller connected to the communicator, in which the controller determines a matching state of the one or more user terminals and the one or more reconfigurable intelligent surfaces that maximizes a sum of data rates for the one or more user terminals connected through the communicator, on/off states of one or more reflective elements included in the one or more reconfigurable intelligent surfaces, total power consumption, and a phase value of the one or more reflective elements included in the one or more reconfigurable intelligent surfaces.

3

The matching state of the one or more user terminals and the one or more reconfigurable intelligent surfaces may indicate whether or not the base station uses each of the one or more reconfigurable intelligent surfaces in performing at least one of transmitting and receiving signals to and from each of the one or more user terminals.

In the case of a reconfigurable intelligent surface with the one or more user terminals matched among the one or more reconfigurable intelligent surfaces, at least one reflective element may be assigned to each of one or more matched user terminals to be in an on state.

The total power consumption may be a sum of transmission power of the base station, circuit power consumption of the base station, circuit power consumption of each of the one or more user terminals, and circuit power consumption of each of the one or more reconfigurable intelligent surfaces.

The transmission power of the base station is a sum of power for transmitting signals from the base station to the one or more user terminals, and the transmission power of the base station may be less than or equal to a maximum transmission power of the base station.

The circuit power consumption of each of the one or more reconfigurable intelligent surfaces may include power consumed by the one or more reconfigurable intelligent surfaces for phase conversion.

Each of the data rates for the one or more user terminals may be greater than or equal to a minimum data rate.

The controller may determine the matching state of the one or more user terminals and the one or more reconfigurable intelligent surfaces that maximizes the sum of data rates for the one or more user terminals connected through the communicator, the on/off states of the one or more reflective elements included in the one or more reconfigurable intelligent surfaces, the total power consumption, and the phase value of the one or more reflective elements included in the one or more reconfigurable intelligent surfaces, by using deep reinforcement learning (DRL) and convex optimization.

According to another aspect of the present disclosure, there is provided a method of operating a base station that includes one or more processors and a memory storing one or more programs executed by the one or more processors, and communicates with one or more user terminals through one or more reconfigurable intelligent surfaces, the method including determining the one or more user terminals with which to perform communication, and determining a matching state of the one or more user terminals and the one or more reconfigurable intelligent surfaces that maximizes a sum of data rates for the one or more user terminals, on/off states of the one or more reflective elements included in the one or more reconfigurable intelligent surfaces, total power consumption, and a phase value of the one or more reflective elements included in the one or more reconfigurable intelligent surfaces.

According to still another aspect of the present disclosure, there is provided a computer program stored in a non-transitory computer readable storage medium, the computer program including one or more instructions that, when executed by a computing device including one or more processors, cause the computing device to perform: determining one or more user terminals with which to perform communication, and determining a matching state of the one or more user terminals and one or more reconfigurable intelligent surfaces that maximizes a sum of data rates for the one or more user terminals, on/off states of the one or more reflective elements included in the one or more reconfigurable intelligent surfaces, total power consumption, and a phase value of the one or more reflective elements included in the one or more reconfigurable intelligent surfaces.

According to the present disclosure, it is possible to support multi-RIS communication to improve network energy efficiency.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Additionally, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Figure 1:
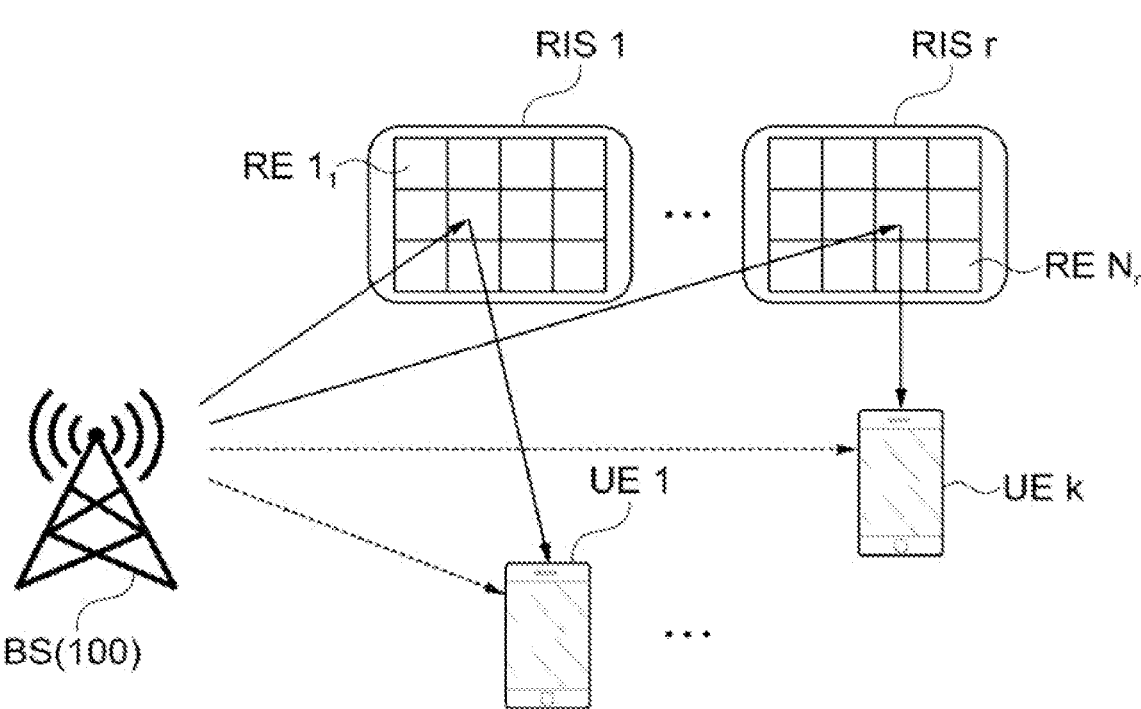
FIG. 1 is an exemplary diagram for describing an environment in which a base station operates according to an embodiment.

FIG. 1 is an exemplary diagram for describing an environment in which a base station operates according to an embodiment.

When there is an obstacle between a base station and a user terminal, it is difficult to obtain a strong line of sight (LoS) link between a transmitter and a receiver. In this case, if multiple RISs are deployed, not only fast transmission can be obtained, but also various paths can be set to improve reception signal strength.

As an example, the reconfigurable intelligent surface is an artificially constructed meta-surface incorporating electronic circuits that can be programmed to reflect incoming signals in various ways. Each RIS unit includes low-cost reflective elements (REs) and can be controlled electronically so as to specify a direction of phase shift in a discrete or continuous configuration.

According to one example, when the base station communicates with the user terminal, the base station may be directly connected to the user terminal, or may be connected to the user terminal through the reconfigurable intelligent surface. In this case, the base station can assign at least one of the reflective elements included in the reconfigurable intelligent surface to the user terminal and control a phase value of the assigned reflective elements.

As an example, in FIG. 1, a situation of a multi-RIS-based wireless downlink communication system is assumed. Referring to FIG. 1, in the communication system, a single base station (BS) with multi-antenna is referred to as 100, a set of r RISs is referred to as R, and a set of k user terminals consisting of a single antenna is referred to as K. Each RIS r is $r \in R$, and the reflection elements of the RISs can be represented by a set of $N_r=[1_r, 2_r, \ldots, N_r]$. Each reflective element is denoted by $n_r$ and can be assigned with a phase conversion device to reconstruct an incident signal in order to utilize communication services. The available radio frequency of the base station is divided into each carrier frequency $C=\{C_1 C_2, \ldots, C_K\}$ and has a bandwidth of W. In addition, assuming that the base station and the user transmit signals through different carrier frequencies, even if the RIS reflects all received signals, the received signal of a given carrier frequency can be decoded to the user.

As an example, both direct and indirect communication between the base station and the user are considered, and the direct communication link therebetween can be modeled based on Rayleigh fading. Accordingly, a channel gain between the base station and user terminal k can be represented by Equation 1.

$$H_{B,k} = \sqrt{\rho d_{b,k}^{-\alpha_{b,k}} \tilde{h}}$$ [Equation 1]

Here, $d_{b,k}$ is the distance between the user terminal k and the base station, and $\rho$ represents a path loss at a reference distance of $d_0=1$ m. $\alpha_k \geq 2$ is a path loss exponent, and $\tilde{h}$ is a random scattering component of a complex Gaussian random variable with unit variance and zero mean. In the case of the indirect communication link, there are two components of communication between the base station and the RIS and communication between the RIS and the user terminal. Rayleigh fading can be used in the communication between the base station and the RIS. Accordingly, the channel gain between the base station and the RIS is r, and $h_{B,r}$ can be configured based on Equation 1. In the communication between the RIS and the user terminals, both the LOS and Non-LoS (NLoS) can be considered. Accordingly, Rician fading can be applied to the channel gain between the RIS r and the user terminal k, and can be represented by Equation 2 below.

$$h_{r,k} = \sqrt{\rho d_{r,k}^{-\alpha_{r,k}}} \left( \sqrt{\frac{\hat{R}}{1+\hat{R}}} h_{r,k}^{LoS} + \sqrt{\frac{1}{1+\hat{R}}} h_{r,k}^{NLoS} \right)$$ [Equation 2]

Here, $d_{r,k}$ is the distance between the RIS r and the user terminal k, and $\hat{R}$ represents Rician fading. And $$h_{r,k}^{LoS}$$

a deterministic LOS component vector including an angle of departure (AoD).

$$h_{r,k}^{NLoS}$$

is a NLoS component vector, each of which follows a complex Gaussian distribution which is independent and identically distribution (i.i.d). The reflection element n included in RIS r reflects the incident signal of a set of feasible phase shift values, as shown in Equation 3.

$$\theta_{n_r} = e^{\left(\frac{2\pi\phi}{2^b}\right)}, \forall r \in \mathcal{R}. \forall n \in \mathbb{N}$$ [Equation 3]

Here, $\phi$ is the phase shift exponent and b is the solution of the phase shift-variant in the bit. Accordingly, the phase shift value of the RIS r can be represented by a vector of is $\theta_r=[\theta_{2r}, \ldots, \theta_{Nr}]$. In conclusion, the reflection coefficient matrix is $\Theta_r$, and can be represented by Equation 4 below.

$$\Theta_r = \mathrm{diag}\left(k_{1_r} e^{j\theta_{1_r}}, k_{2_r} e^{j\theta_2 r}, \ldots, k_{N_r} e^{j\theta_{N_r}}\right)$$ [Equation 4]

Here, $k_{n_r}$ is an amplified reflection coefficient of an n-th reflection element of RIS r, and j is a complex number. When applying this, the signal received at the user terminal k can be represented by Equation 5.

$$y_k = \sqrt{p_k} \left( H_{B,k} s_k + \sum_{r=1}^{R} h_{r,k} \Theta_r h_{B,r} s_k \right) + w_k$$ [Equation 5]

Here, $p_k$ and $s_k$ are the transmission power of the base station for the user terminal k and the transmission signal based on the unit power complex, respectively, and $\omega_k$ represents the additional Gaussian white noise at the receiver.

Figure 2:
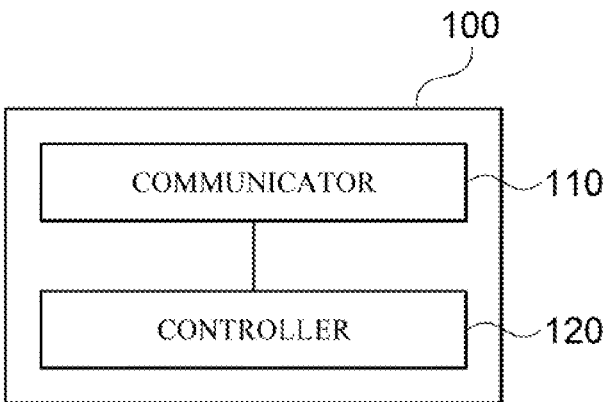
FIG. 2 is a configuration diagram of a base station according to an embodiment.

FIG. 2 is a configuration diagram of the base station according to an embodiment.

According to one embodiment, the base station 100 that communicates with one or more user terminals through one or more reconfigurable intelligent surfaces may include a communicator 110 that performs communication with at least one of the one or more user terminals and the one or more reconfigurable intelligent surfaces (RISs), and a controller 120 connected to the communicator.

As an example, the base station 100 may be connected to the one or more reconfigurable intelligent surfaces in a wired manner or wirelessly. The controller 120 may control the power supply and phase values of reflective elements included in the one or more reconfigurable intelligent surfaces connected in a wired manner or wirelessly through the communicator 110.

According to one embodiment, the controller may determine a matching state of the one or more user terminals and the one or more reconfigurable intelligent surfaces that maximizes a sum of data rates for the one or more user terminals connected through the communicator 110, on/off states of the one or more reflective elements included in the one or more reconfigurable intelligent surfaces, total power consumption, and phase values of the one or more reflective elements included in the one or more reconfigurable intelligent surfaces.

As an example, the controller 120 may perform optimization based on Equation 6 below.

$$P: \max_{X,Y,P,\Theta} \frac{\sum_{k=1}^{K} r_k}{P}$$ [Equation 6]

$$\text{s.t. } C1: \sum_{k=1}^{K} p_k \leq P_{max}$$

$$C2: r_k \geq r_k^{min}, \forall k \in \mathcal{K}$$

$$C3: 0 \leq \theta_{n_r} < 2\pi, \forall r \in \mathcal{R}, \forall n \in \mathcal{N}$$

$$C4: y_k^{n_r} \leq x_k^r, \forall k \in \mathcal{K}, \forall r \in \mathcal{R}$$

$$C5: x_k^r \in \{0, 1\}, \forall r \in \mathcal{R}$$

$$C6: y_k^{n_r} \in \{0, 1\}, \forall k \in \mathcal{K}$$

Here, Constraint C1 indicates that the total transmission power of the base station should be less than $P_{max}$, which is the maximum power available at the base station. Constraint C2 represents a Quality of Service (QOS) constraint for each user. Constraint C3 requires that the phase shift value be between 0 and $2\pi$, represented by $\theta_{n_r} \in [0,2\pi]$. Constraint C4 represents the condition that if a user k belongs to any $RIS_r \in R$, the reflection element of the corresponding RIS should be on for the user k. Lastly, Constraints C5 and C6 represent binary constraints for the connection between the user and the RIS and the On/Off states of reflection elements, respectively.

As an example, the data rate in Equation 6 can be represented by Equation 7 below.

$$r_k = W \log_2 1 + \gamma_k$$ [Equation 7]

Here, W represents the total available bandwidth for the user terminal, and $\gamma_k$ is the signal-to-noise ratio (SNR), which can be represented by Equation 8 below.

$$\gamma_k = \frac{p_k \left| H_{B,k} s_k + \sum_{r=1}^{R} \sum_{n=1}^{N_r} x_k^r y_k^{n_r} h_{r,k} \Theta_r h_{B,r} s_k \right|^2}{\sigma^2}$$ [Equation 8]

According to one embodiment, the matching state of the one or more user terminals and the one or more reconfigurable intelligent surfaces may indicate whether or not the base station uses each of the one or more reconfigurable intelligent surfaces in performing at least one of transmitting and receiving signals to and from each of one or more user terminals. For example, the matching state of the one or more user terminals and the one or more reconfigurable intelligent surfaces can be represented by $X \in R^{|K| \times |R|}$. Here, X represents the parameters of Equation 6, and represents the association matrix of all user terminals |K| for all RIS |R| in the system. For each user terminal k, each element of the association matrix can be represented by Equation 9 below.

$$x_k^r = \begin{cases} 1, \text{ if } BS \text{ transmit to } UE \text{ } K \text{ via } RIS \text{ } r \\ 0, \text{ otherwise} \end{cases}$$ [Equation 9]

8

According to one embodiment, in the case of a reconfigurable intelligent surface with the one or more user terminals matched among the one or more reconfigurable intelligent surfaces, at least one reflective element may be assigned to each of the one or more matched user terminals to be in an on state. For example, as shown in Constraint C4 in Equation 6, for any RIS $r \in R$, if the user k belongs to the RIS, the reflection element of the corresponding RIS should be on for the user k.

As an example, $Y \in R^{|R| \times |N|}$ is the On/Off state matrix for all reflection elements $|N_r|$, and represents the parameters of Equation 6. For example, the base station may turn ON and OFF the switch of one or more reflective elements included in the reconfigurable intelligent surface in order to conserve energy. In this case, the ON/OFF state for each reflective element nr can be defined as Equation 10 below.

$$y_k^{n_r} = \begin{cases} 1, \text{ if reflective elements } n_r \text{ is switched on} \\ 0, \text{ otherwise} \end{cases}$$ [Equation 10]

According to one embodiment, the total power consumption may be a sum of the transmission power of the base station, circuit power consumption of the base station, circuit power consumption of each of the one or more user terminals and circuit power consumption of each of the one or more reconfigurable intelligent surfaces. For example, it may be assumed that the base station controls the phase conversion of all RIS reflective elements. In addition, it may be assumed that the RIS reflective element is a passive element and does not consume any power for transmission. In this case, the total power of communication supported by the multi-RIS may consist of base station transmission power, power for RIS phase conversion, and circuit power consumption of all users and the base station. Accordingly, the total power consumption of the system can be represented by Equation 11 below.

$$P = \sum_{k=1}^{k} (\vartheta p_k + P_k^c) + \sum_{r=1}^{R} \sum_{n=1}^{N_r} x_k^r y_k^{n_r} N_r P_{RIS} + \hat{P}_B$$ [Equation 11]

Here, $1/\vartheta$ represents the efficiency of a transmission power amplifier, $p_k$ represents the transmission power of the base station, and $$P_k^c$$

represents circuit power of each user terminal k. $P_{RIS}$ and $\hat{P}_B$ represent circuit power consumption of RIS r and circuit power consumption of the base station, respectively.

According to one embodiment, the transmission power of the base station is the sum of power for transmitting signals from the base station to the one or more user terminals, and the transmission power of the base station may be less than or equal to the maximum transmission power of the base station. For example, as in Constraint C1 in Equation 6, the total transmission power of the base station should be less than $P_{max}$, which is the maximum power available at the base station.

According to one embodiment, the circuit power consumption of each of the one or more reconfigurable intelligent surfaces may include power consumed by the one or more reconfigurable intelligent surfaces for phase conversion. For example, the circuit power consumption of each reconfigurable intelligent surface may include $P_{RIS}$ in Equation 11.

According to one embodiment, each of the data rates for the one or more user terminals may be greater than or equal to the minimum data rate. For example, as with Constraint C2 in Equation 6, in order to guarantee QoS for each user, each data rate for the user terminal should be greater than or equal to the minimum data rate.

According to one embodiment, the controller may determine the matching state of one or more user terminals and one or more reconfigurable intelligent surfaces that maximizes a sum of data rates for the one or more user terminals connected through the communicator, the on/off states of one or more reflective elements included in the one or more reconfigurable intelligent surfaces, the total power consumption, and the phase value of the one or more reflective elements included in the one or more reconfigurable intelligent surfaces, by using deep reinforcement learning (DRL) and convex optimization.

For example, the deterministic variables X, Y, P and Θ in Equation 6 are commonly associated with Constraint C2 and the objective function. In addition, the formulated problem is a mixed integer type and is not convex. As a result, the problem becomes an NP-Hard problem and is difficult to solve in polynomial time. Accordingly, when applying the BCD approach, the problem can be divided into two sub-problems. For example, the problem can be divided into 1) multiple user-RIS connection, ON/OFF states of reflective elements, phase shift problem, and 2) power control problem. Thereafter, the controller 120 may apply the DRL method and the convection optimization technique to solve the sub-problems.

Figure 3:
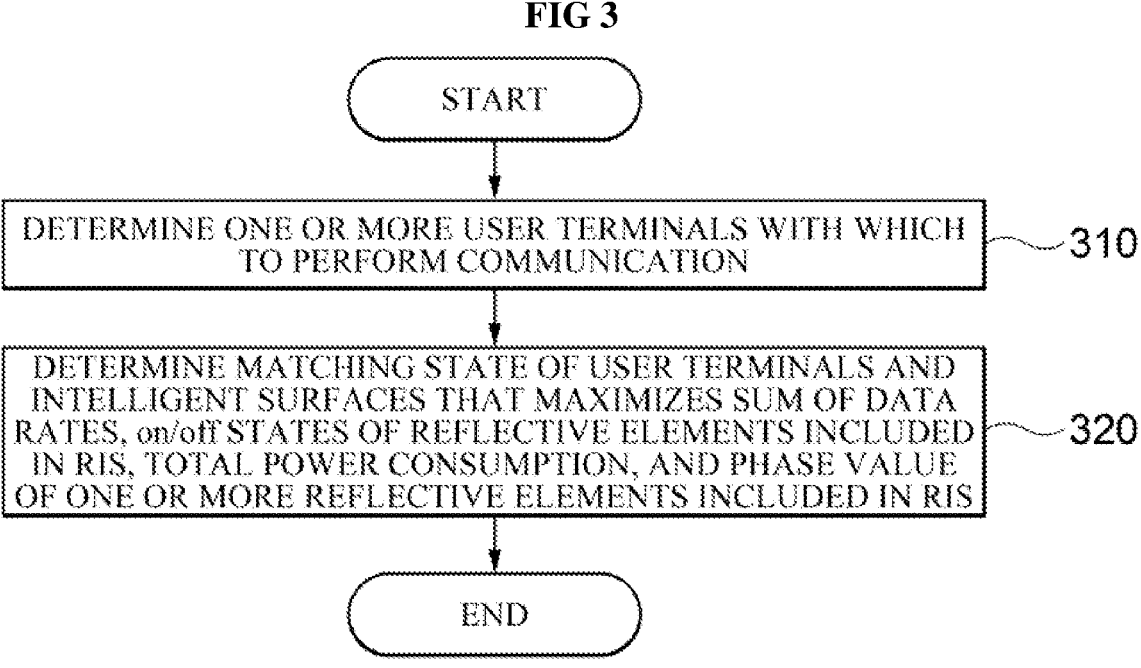
FIG. 3 is a flowchart illustrating a method of operating the base station according to an embodiment.

FIG. 3 is a flowchart illustrating a method of operating the base station according to an embodiment.

According to one example, the base station includes one or more processors and a memory storing one or more programs executed by the one or more processors, and may communicate with the one or more user terminals through the one or more reconfigurable intelligent surfaces. To this end, the base station can determine one or more user terminals with which to perform communication (310). Thereafter, the base station may determine the matching state of the one or more user terminals and the one or more reconfigurable intelligent surfaces that maximize a sum of data rates for the one or more user terminals, the on/off states of the one or more reflective elements included in the one or more reconfigurable intelligent surfaces, total power consumption, and the phase value of the one or more reflective elements included in the one or more reconfigurable intelligent surfaces (320).

In the embodiment of FIG. 3, contents overlapping the contents described with reference to FIGS. 1 and 2 have been omitted.

Figure 4:
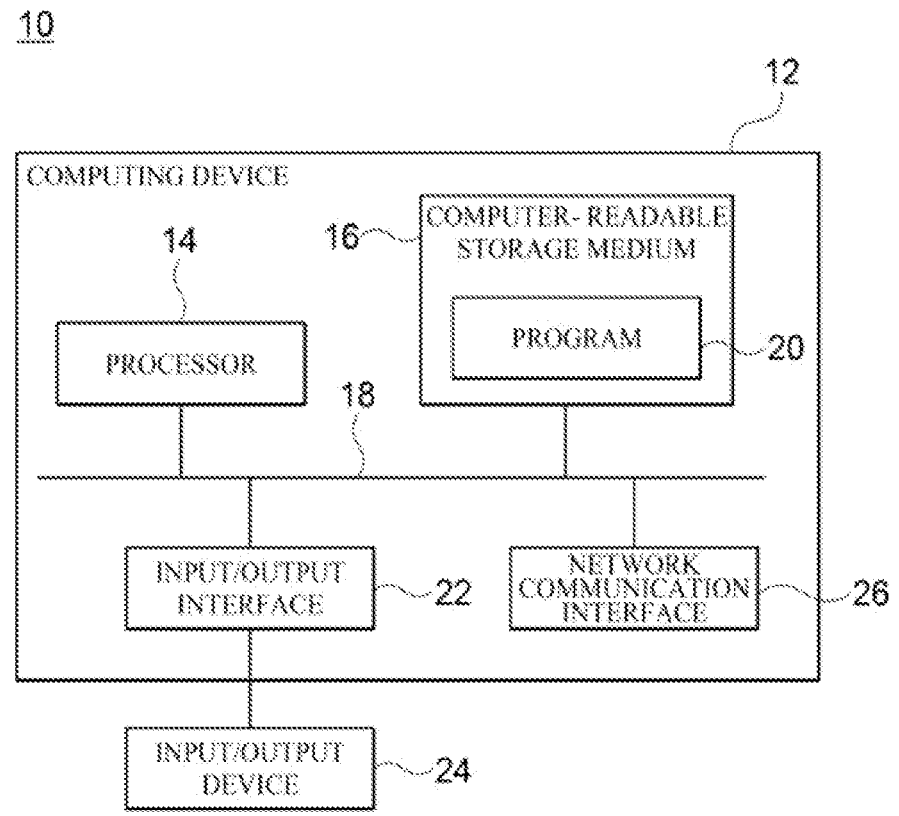
FIG. 4 is a block diagram for illustratively describing a computing environment including a computing device suitable for use in exemplary embodiments.

FIG. 4 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the base station.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to the present disclosure, it is possible to support multi-RIS communication to improve network energy efficiency.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A base station comprising:
a network communication interface configured to perform communication with at least one of one or more user terminals and one or more reconfigurable intelligent surfaces; one or more processors; and
a memory storing one or more programs, wherein the one or more processors are connected to the network communication interface and the memory and are configured to execute the one or more programs to determine a matching state of the one or more user terminals and the one or more reconfigurable intelligent surfaces that maximizes a sum of data rates for the one or more user terminals connected through the network communication interface, on/off states of one or more reflective elements included in the one or more reconfigurable intelligent surfaces, total power consumption, and a phase value of the one or more reflective elements included in the one or more reconfigurable intelligent surfaces, wherein the matching state of the one or more user terminals and the one or more reconfigurable intelligent surfaces indicate whether or not the base station uses each of the one or more reconfigurable intelligent surfaces in performing at least one of transmitting and receiving signals to and from each of one or more user terminals, and wherein in the case of a reconfigurable intelligent surface with the one or more user terminals matched among the one or more reconfigurable intelligent surfaces, at least one reflective element is assigned to each of one or more matched user terminals to be in an on state.

2. The base station of claim 1, wherein the total power consumption is a sum of transmission power of the base station, circuit power consumption of the base station, circuit power consumption of each of the one or more user terminals, and circuit power consumption of each of the one or more reconfigurable intelligent surfaces.

3. The base station of claim 2, wherein the transmission power of the base station is a sum of power for transmitting signals from the base station to the one or more user terminals, and the transmission power of the base station is less than or equal to a maximum transmission power of the base station.

4. The base station of claim 2, wherein the circuit power consumption of each of the one or more reconfigurable intelligent surfaces includes power consumed by the one or more reconfigurable intelligent surfaces consume for phase conversion.

5. The base station of claim 1, wherein each of the data rates for the one or more user terminals is greater than or equal to a minimum data rate.

6. The base station of claim 1, wherein the one or more processors are configured to determine the matching state of the one or more user terminals and the one or more reconfigurable intelligent surfaces that maximize the sum of data rates for the one or more user terminals connected through the network communication interface, the on/off states of one or more reflective elements included in the one or more reconfigurable intelligent surfaces, the total power consumption, and the phase value of the one or more reflective elements included in the one or more reconfigurable intelligent surfaces, by using deep reinforcement learning (DRL) and convex optimization.

7. A method of operating a base station that includes one or more processors and a memory storing one or more programs executed by the one or more processors, and a network communication interface configured to communicate with one or more user terminals through one or more reconfigurable intelligent surfaces, the method comprising:

determining the one or more user terminals with which to perform communication; and determining a matching state of the one or more user terminals and the one or more reconfigurable intelligent surfaces that maximizes a sum of data rates for the one or more user terminals, on/off states of one or more reflective elements included in the one or more reconfigurable intelligent surfaces, total power consumption, and a phase value of the one or more reflective elements included in the one or more reconfigurable intelligent surfaces, wherein the matching state of the one or more user terminals and the one or more reconfigurable intelligent surfaces indicate whether or not the base station uses each of the one or more reconfigurable intelligent surfaces in performing at least one of transmitting and receiving signals to and from each of one or more user terminals, and wherein in the case of a reconfigurable intelligent surface with the one or more user terminals matched among the one or more reconfigurable intelligent surfaces, at least one reflective element is assigned to each of one or more matched user terminals to be in an on state.

8. The method of claim 7, wherein the total power consumption is a sum of transmission power of the base station, circuit power consumption of the base station, circuit power consumption of each of the one or more user terminals, and circuit power consumption of each of the one or more reconfigurable intelligent surfaces.

9. The method of claim 8, wherein the transmission power of the base station is a sum of power for transmitting signals from the base station to the one or more user terminals, and the transmission power of the base station is less than or equal to a maximum transmission power of the base station.

10. The method of claim 8, wherein the circuit power consumption of each of the one or more reconfigurable intelligent surfaces includes power consumed by the one or more reconfigurable intelligent surfaces consume for phase conversion.

11. The method of claim 7, wherein each of the data rates for the one or more user terminals is greater than or equal to a minimum data rate.

12. The method of claim 7, wherein, in the determining, the matching state of the one or more user terminals and the one or more reconfigurable intelligent surfaces that maximize the sum of data rates for the one or more user terminals connected through the network communication interface, the on/off states of one or more reflective elements included in the one or more reconfigurable intelligent surfaces, the total power consumption, and the phase value of the one or more reflective elements included in the one or more reconfigurable intelligent surfaces are determined, by using deep reinforcement learning (DRL) and convex optimization.

13. A non-transitory computer readable storage medium storing a computer program including one or more instructions that, when executed by a computing device including one or more processors, cause the computing device to perform:

determining one or more user terminals with which to perform communication; and determining a matching state of one or more user terminals and one or more reconfigurable intelligent surfaces that maximize a sum of data rates for the one or more user terminals, on/off states of one or more reflective elements included in the one or more reconfigurable intelligent surfaces, total power consumption, and a phase value of the one or more reflective elements included in the one or more reconfigurable intelligent surfaces, wherein the matching state of the one or more user terminals and the one or more reconfigurable intelligent surfaces indicate whether or not a base station uses each of the one or more reconfigurable intelligent surfaces in performing at least one of transmitting and receiving signals to and from each of one or more user terminals, and wherein in the case of a reconfigurable intelligent surface with the one or more user terminals matched among the one or more reconfigurable intelligent surfaces, at least one reflective element is assigned to each of one or more matched user terminals to be in an on state.

\* \* \* \* \*